(No Model.)
H. F. GALE.
CABLE COUPLING.
No. 329,727.  Patented Nov. 3, 1885.
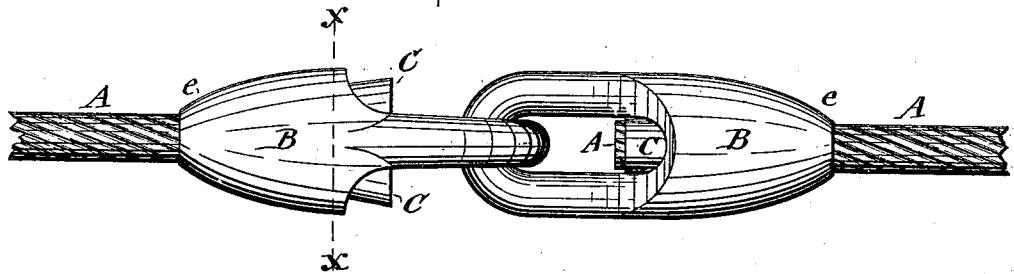
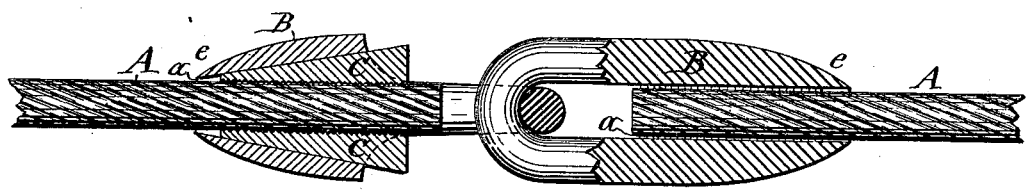
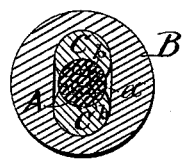
Attest—
Wm. B. Raymond
C. Bendixon
Inventor—
Henry F. Gale
per Duell, Laass & Hey
his attys
N. PETERS, Photo-Lithographer, Washington, D. C.

United States Patent Office.

HENRY F. GALE, OF SYRACUSE, NEW YORK.

CABLE-COUPLING.

SPECIFICATION forming part of Letters Patent No. 329,727, dated November 3, 1885.

Application filed May 25, 1885. Serial No. 166,683. (No model.)

*To all whom it may concern:*

Be it known that I, HENRY F. GALE, of Syracuse, in the county of Onondaga, in the State of New York, have invented new and useful Improvements in Cable-Couplings, of which the following, taken in connection with the accompanying drawings, is a full, clear, and exact description.

This invention relates to the class of cable-couplings which consists of a ferrule or tubular collar linked together, and each receiving in its interior one of the ends of the cable to be coupled, and wedges introduced between the sides of the aforesaid portion of the cable and interior of the ferrule to complete the coupling.

My invention consists in an improved construction of a coupling of the class aforesaid, specially adapted for cables running over pulleys, and designed to obviate jars on the pulleys and danger of catching on objects which may come in contact with the cable.

In the annexed drawings, Figure 1 is a side view of my invention. Fig. 2 is a longitudinal section of the same, and Fig. 3 is a transverse section on line $x\ x$ in Fig. 1.

Similar letters of reference indicate corresponding parts.

B B' represent the two ferrules or tubular collars, which are linked together, and are each provided with the channel $a$, which is transversely elongated, the end of the cable A to be attached being inserted into said channel and retained therein by keys or wedges C C, introduced with their small end foremost into the channel at the end opposite that entered by the cable. Said keys or wedges are provided with serrated concave faces $b$, by which they embrace and effectually grip between them the aforesaid cable, and the greater the draft on the cable the tighter the hold of the said grippers. The transverse elongation of the channel $a$ forms the seats for the keys or grippers C C, said seats being tapered corresponding to the taper of the wedges. The exterior of the ferrules or collars B B', I taper toward opposite ends, as shown at $e\ e$ in the annexed drawings. Said bevels are essential to couplings of cables running over pulleys, inasmuch as the bevels obviate jars and the danger of catching onto obstructions which may be in the passage of the cable. The ends of the two cables to be coupled are inserted in the channels $a$ of the ferrules B B', at the externally-beveled ends thereof, and the keys or wedges C C are inserted with their small ends foremost into the opposite ends of the channels. When the coupled cables A A are subjected to tensile strain, the keys or wedges are drawn farther into their correspondingly-tapered seats in the ferrules, and thus caused to grip the cable more firmly.

Having described my invention, what I claim as new, and desire to secure by Letters Patent, is—

In a cable-coupling of the class herein described, the ferrules or collars B B', beveled externally toward opposite ends, substantially as described and shown, for the purpose set forth.

In testimony whereof I have hereunto signed my name and affixed my seal, in the presence of two attesting witnesses, at Syracuse, in the county of Onondaga, in the State of New York, this 18th day of May, 1885.

HENRY F. GALE. [L. S.]

Witnesses:
 JOHN LAASS,
 C. BENDIXON.